United States Patent
Nishino

[11] Patent Number: 6,080,083
[45] Date of Patent: Jun. 27, 2000

[54] SHIFT MODE SELECTOR FOR AUTOMATIC TRANSMISSION

[75] Inventor: Kenji Nishino, Kanagawa, Japan

[73] Assignee: Nissan Motor Co., Ltd., Yokohama, Japan

[21] Appl. No.: 09/291,377

[22] Filed: Apr. 14, 1999

[30] Foreign Application Priority Data

Apr. 14, 1998 [JP] Japan ................................. 10-102569
Mar. 26, 1999 [JP] Japan ................................. 11-084005

[51] Int. Cl.$^7$ ............................ F16H 61/08; F16H 61/18
[52] U.S. Cl. ............................................................. 477/125
[58] Field of Search ............................................. 477/125

[56] References Cited

U.S. PATENT DOCUMENTS

| | | | |
|---|---|---|---|
| 4,680,992 | 7/1987 | Hayasaki et al. | 74/869 |
| 5,545,108 | 8/1996 | Wagner et al. | 477/125 |
| 5,586,029 | 12/1996 | Schulz et al. | 477/125 |
| 5,738,607 | 4/1998 | Kondo et al. | 477/125 |
| 5,868,033 | 2/1999 | Nishino et al. | 74/335 R |
| 5,882,277 | 3/1999 | Iizuka | 477/125 |
| 5,908,369 | 6/1999 | Nakauchi et al. | 477/125 |

FOREIGN PATENT DOCUMENTS

| | | |
|---|---|---|
| 62-159839 | 7/1987 | Japan . |
| 6-331019 | 11/1994 | Japan . |
| 9-242868 | 9/1997 | Japan . |

*Primary Examiner*—Dirk Wright
*Attorney, Agent, or Firm*—Foley & Lardner

[57] ABSTRACT

A shift mode selector for an automatic transmission of a vehicle drive train including an engine, includes a first shift point map for an automatic shift in an automatic shift mode and a second shift point map in a manual shift mode. An input device produces an operator mode change demand from the manual shift mode to the automatic shift mode. A controller determines whether or not a potential downshift demand is available upon effecting a mode change demanded by said operator mode change demand. The controller prohibits the mode change when said potential downshift demand is available, and produces a gear ratio control signal in accordance with the second shift point map unless a predetermined condition is met. The gear ratio control signal is applied to a gear ratio actuator for establishing various gear ratios in the automatic transmission.

8 Claims, 5 Drawing Sheets

FIG.2(a)

|  | SHIFT SOL. A | SHIFT SOL. B |
|---|---|---|
| 1st. RATIO | ON | ON |
| 2nd. RATIO | OFF | ON |
| 3rd. RATIO | OFF | OFF |
| 4th. RATIO | ON | OFF |

FIG.2(b)

| | CLUTCH/BRAKE | | | | | | | |
|---|---|---|---|---|---|---|---|---|
| | F/C | H/C | B/B | LR/B | OR/C | L/OWC | F/OWC | R/C |
| 1st. RATIO | ○ | × | × | (○) | (○) | ○ | ○ | × |
| 2nd. RATIO | ○ | × | ○ | × | (○) | × | ○ | × |
| 3rd. RATIO | ○ | ○ | × | × | (○) | × | ○ | × |
| 4th. RATIO | × | ○ | ○ | × | × | × | × | × |
| REV. | × | × | × | ○ | × | × | × | ○ |

FIG.4

| $M_{SW}$ | $M_m$ | $M_D$ |
|---|---|---|
| ON | ON | OFF |
| OFF | OFF | ON |
| KEEP | ON (OFF) ||

SHIFT MODE SELECTOR FOR AUTOMATIC TRANSMISSION

FIELD OF THE INVENTION

The present invention relates to a shift mode selector for an automatic transmission of a vehicle drive train, which mode selector enables an operator to select one of various shift modes in which the automatic transmission is operable. More particularly, the present invention relates to a technique for controlling occurrence of a downshift upon effecting a change into an automatic shift mode from a special shift mode fit for a particular purpose.

BACKGROUND OF THE INVENTION

JP-A 6-331019 discloses a shift mode selector for an automatic transmission. According to this known mode selector, an operator can select one of a plurality of shift modes. The shift modes that may be selected by the operator include an automatic shift (D) mode and a manual shift (M) mode as a special shift mode fit for a particular purpose. Upon operator selection of a drive range in the automatic shift (D) mode, a microprocessor retrieves data from a drive range shift point map against engine load signal and vehicle speed signal and processes the retrieved data to produce a gear ratio control signal. A gear ratio control actuator is operable in response to the gear ratio control signal to establish various gear ratios in the automatic transmission. Upon operator selection of the manual shift (M) mode, the microprocessor receives an operator upshift or downshift demand, retrieves data from a manual range shift point map and processes the retrieved data and the operator upshift or downshift demand to produce the gear ratio control signal. Basically, the gear ratio control actuator establishes a gear ratio desired by the operator if the operator upshift or downshift demand is valid in view of current engine load signal and vehicle speed signal.

The control system employed by the known shift mode selector is fairly developed. However, a need remains for further development of such control systems, particularly in view of current movement to increase user satisfaction at less cost increase.

SUMMARY OF THE INVENTION

According to the technique as far as known to the inventor, a memory includes a first shift point map for an automatic shift range in automatic shift mode. The shift point map stores data that relates the transmission gear ratio to an engine load signal and a vehicle speed signal. The memory also includes a second shift point map for a manual shift range in manual shift mode. The second shift point map stores data used for evaluating whether or not a gear ratio demanded by an operator is valid in view of engine load signal and vehicle speed signal. FIG. 5(a) is a simplified illustration of the second shift point map, showing only downshift points from the third gear ratio. FIG. 5(b) is a simplified illustration of the first shift point map. The first shift point map only shows 4-3 downshift points from the fourth gear ratio $C_4$, 3-2 downshift points from the third gear ratio $C_3$ and 2-1 downshift points from the second gear ratio $C_2$. In FIG. 5(b), the reference character $C_1$ indicates the first gear ratio. Although FIG. 5(a) shows downshift points from the third gear ratio "3" only, the second shift point map includes shift points for other gear ratios. If, now, an operator keeps selecting the third gear ratio with a select lever left in manual shift (M) mode, the third gear ratio is held over the shadowed range in FIG. 5(a). Under this condition, the operator may feel as if operating a manual transmission with the third gear ratio.

Referring to FIG. 5(a), the automatic transmission in the vehicle drive train is operated at an operating point x in the manual shift mode. The gear ratio established in the automatic transmission is held at the third gear ratio. Under this condition, the operator manipulates the select lever to select the automatic shift (D) mode. Referring to FIG. 5(b), the operating point x falls in the second gear ratio range $C_2$ of the shift point map for the automatic shift (D) mode, creating a potential downshift demand from the current third gear ratio to the second gear ratio. Shocks due to occurrence of such a downshift might in certain circumstances fall outside of what the operator anticipates in connection with an operator mode change to the automatic shift (D) mode through the select lever.

An object of the present invention is to control occurrence of shift after a mode change such that shocks due to occurrence of a downshift falls in what the operator normally anticipates in connection with the mode change.

According to the present invention, there is provided a shift mode selector for an automatic transmission of a vehicle drive train including an engine, comprising:

a memory including a first shift point map for an automatic shift range in an automatic shift mode and a second shift point map for a manual shift range in a special shift mode;

an input device producing an operator mode change demand from the special shift mode to the automatic shift mode;

a microprocessor determining whether or not a potential downshift demand is available upon effecting a change from the second shift point map to the first shift point map due to a mode change demanded by said operator mode change demand, said microprocessor delaying the change in shift point map and producing a gear ratio control signal in accordance with said second shift point map upon determination that said potential downshift demand is available unless a predetermined condition is met; and a gear ratio control actuator establishing various gear ratios in the automatic transmission in response to said gear ratio control signal.

The special shift mode fit for the particular purpose may be a manual shift mode, an economy mode, a snow mode and a power mode. The term "special shift mode" is hereby used in this application to mean a manual shift mode or an economy mode or a snow mode or a power mode. In the manual shift mode, the vehicle operator can determine a gear ratio to be established in the automatic transmission. In the economy mode, a shift point map designed for improved fuel consumption is used. In the snow mode, a shift point map designed for driving in snow terrain is used. In the power mode, a shift point map deigned for increased power output is used.

BRIEF DESCRIPTION OF THE DRAWINGS

FIG. 2(a) is a table illustrating the relationship between two shift solenoids and the four forward gear ratios.

FIG. 2(b) is a table illustrating the relationship between torque transmitting units (clutch/brake) and the four forward gear ratios and one reverse ratio.

FIG. 4 is a table illustrating the relationship between the levels of a mode switch, a manual shift mode switch and an automatic shift mode switch.

DESCRIPTION OF THE PREFERRED EMBODIMENT

Figure 1:
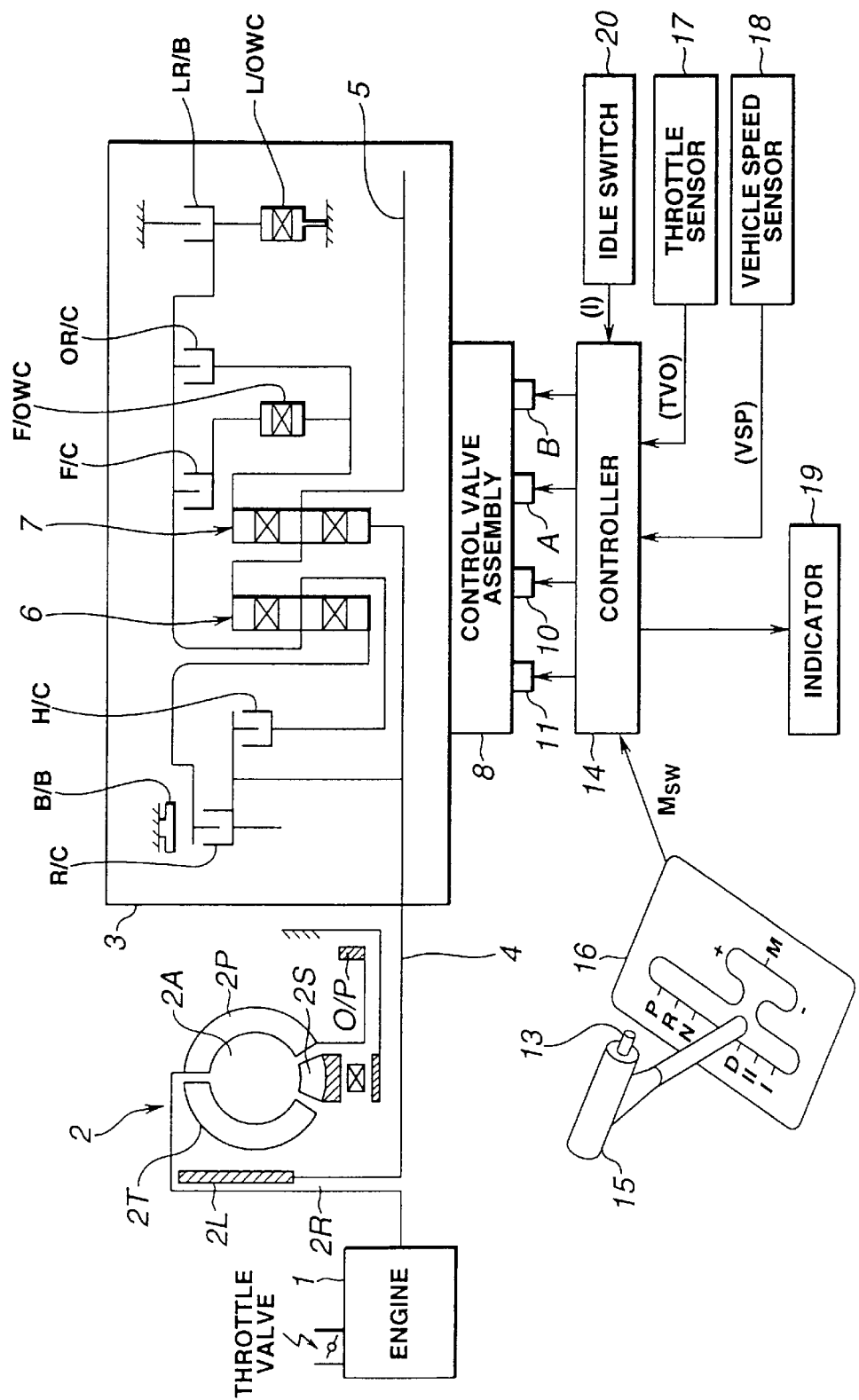
FIG. 1 is a schematic illustration of the preferred implementation of the present invention.

FIG. 1 illustrates an automobile drive train including an engine 1 with a throttle valve which opens in degrees as an operator depresses a gas or an accelerator pedal. A torque converter 2 has an input element in the form of a pump impeller 2P, an output element in the form of a turbine runner 2T and a stator 2S. The pump impeller 2P is connected to an output shaft of the engine 1 to be driven thereby. An oil pump O/P is connected to the pump impeller 2P to be driven thereby. The turbine runner 2T is connected to an input shaft 4 of an automatic transmission 3. Oil is disposed between the pump impeller 2P and the turbine runner 2T to provide a hydraulic drive between them. This hydraulic drive provides a slip between the pump impeller 2P and the turbine runner 2T.

A torque converter lock-up clutch 2L is situated between the engine output shaft and the input shaft 4. In this example, the lock-up clutch 2L forms a part of the torque converter 2. When the lock-up clutch 2L is engaged, the torque converter 2 locks up, providing mechanical drive without any slip. The lock-up clutch 2L defines on one side a lock-up release chamber 2R and on the opposite side a lock-up application chamber 2A. When oil is discharged from the lock-up release chamber 2R, the lock-up clutch 2L is engaged. In response to pressure build-up within the lock-up release chamber 2R, the lock-up clutch 2L is disengaged toward its release position.

The automatic transmission 3 provides four forward gear ratios and one reverse gear ratio between the input shaft 4 and an output shaft 5. The drive train including the engine 1, torque converter 2 and the automatic transmission 3 is described in JP-A 62-159839 and U.S. Pat. No. 4,680,992 (issued Jul. 21, 1987 to Hayasaki et al.) that has been incorporated by reference in its entirety.

Briefly explaining, two planetary gear sets, namely a front planetary gear set 6 and a rear planetary gear set 7, are situated between the input and output shafts 4 and 5.

Torque transmitting friction units include a forward clutch F/C, a high clutch H/C, a band brake B/B, a low one-way clutch L/OWC, a forward one-way clutch F/OWC and a reverse clutch R/C. For effective engine braking, a low reverse brake LR/B is arranged in parallel with respect to the low one-way clutch L/OWC and an overrunning clutch OR/C is arranged in parallel with respect to the forward one-way clutch F/OWC.

The table in FIG. 2(b) shows which one or ones of the torque transmitting units should be engaged for each of gear ratios. In this table, the circle ○ indicates engagement and the cross x indicates release. Each of the bracketed circle (○) below the low reverse brake LR/B and the overrunning clutch OR/C indicates engagement required for effective engine braking. Upon demand for engine braking through manipulation of an overdrive (OD) inhibitor switch 13, the overrunning clutch OR/C is engaged for the third gear ratio. Upon demand for engine braking through selection of a II or I range position by a shift lever 15, the overrunning clutch OR/C is engaged for the second gear ratio and the low reverse brake LR/B is also engaged for the first gear ratio.

The automatic transmission provides a gear train for the fourth gear ratio. This gear train provides effective engine braking, requiring no additional overrunning clutch for effective engine braking.

For distribution of oil under line pressure, the control valve assembly 8 includes a shift solenoid A, a shift solenoid B and an overrunning clutch solenoid 10. The control valve assembly 8 also includes a lock-up solenoid 11 for controlling the lock-up clutch 2L. The detailed description of the control valve assembly 8 with the solenoids A, B, 10 and 11 may be found in description from column 5 line 49 to column 29 line 11 of the incorporated U.S. Pat. No. 4,680, 992. In this description, shift solenoids 42 and 44 corresponds to the shift solenoids A and B, a solenoid 34 corresponds to the lock-up solenoid 11, and a solenoid 60 corresponds to the overrunning clutch solenoid 10.

The table in FIG. 2(a) illustrates which one or ones of shift solenoids A and B should be energized for each of the four forward gear ratios. In the table, the symbol "ON" indicates energized state, and the symbol "OFF" indicates de-energized state.

When the lock-up solenoid 11 is in the state of "ON", the lock-up clutch 2L is engaged, causing occurrence of a lock-up application in the torque converter 2. When the lock-up solenoid 11 is in the state of "OFF", the lock-up clutch 2L is released, causing occurrence of a lock-up release in the torque converter 2. The lock-up solenoid 11 is operative to take "ON" in response to the presence of a lock-up signal or "OFF" in response to the absence of the lock-up signal.

The solenoids A, B, 10 and 11 are under the control of a controller 14. The controller 14 includes an input interface, an output interface, a microprocessor unit (MPU), a memory, preferably in the form of a read only memory (ROM) and a random access memory (RAM). The memory includes the first shift point map, see FIG. 5(b), for a drive range in automatic shift mode and the second shift point map, see FIG. 5(a), for a manual range in manual shift mode. The memory also includes a third shift point map for a II range in automatic shift mode and a fourth shift point map for a I range in automatic shift mode. The microprocessor inputs an appropriate one of the shift point maps to manipulation of a shift lever 15 of an input device. The shift lever 15 has an automatic shift (D) mode and a manual shift (M) mode. In the illustrated position in FIG. 1, the shift lever 15 is placed at a D (drive) range in the D mode. In the D mode, the shift lever 15 has II range and I range, both being selected for effective engine braking. In the D mode, the shift lever 15 has a N (neutral) range, a R (reverse) range and a P (park) range. In the M mode, the shift lever 15 has an upshift "+" position and a downshift "−" position. The input device is equipped with a mode switch 16. The mode switch 16 produces a two-level mode switch signal $M_{SW}$. When the select lever 15 of the input device is in the D mode, the mode switch signal $M_{SW}$ assumes an OFF level. When the select lever 15 is in the M mode, the mode switch signal $M_{SW}$ assumes an ON level. The mode switch signal $M_{SW}$ is fed to the controller 14 where the microprocessor recognizes an operator mode change demand in response to a change in level of the mode switch signal $M_{SW}$.

The select lever 15 is equipped with a manually operable overdrive (OD) inhibitor switch 13. The OD inhibitor switch 13 produces a two-level signal that is fed to the controller 14.

The controller 14 is connected to an engine load sensor in the form of a throttle sensor 17, a vehicle speed sensor 18 and an idle or idling switch 20.

The idling switch 20 is operatively associated with an accelerator or gas pedal and senses an operator coasting demand to produce a two-level signal. This two-level signal assumes an ON level when the accelerator pedal is released to indicate an operator coasting demand, and it assumes an OFF level when the accelerator pedal is depressed. This two-level signal indicative of operator coasting demand is fed to the controller 14.

The vehicle speed sensor 18 senses, as a first operating parameter indicative of vehicle speed, a speed of the transmission output shaft 5 and produces a vehicle speed signal VSP. The engine load sensor 17 senses, as a second operating parameter indicative of the magnitude of engine load, an opening degree of the throttle valve of the engine 1 and produces an engine load signal TVO. The operator may issue an engine braking demand in the third gear ratio through the OD inhibitor switch 13.

The controller 14 applies a first kind of instructions to an indicator 19 when the select lever 15 is in the M mode and a second kind of instructions to the indicator 19 when the select lever 15 is in the D mode. In response to the first kind of instructions, the indicator 19 may indicate that the manual shift mode is installed. In response to the second kind of instructions, the indicator 19 may indicate that the automatic shift mode is installed.

In the M mode, the select lever 15 is spring biased toward a position away from the upshift "+" position and the downshift "−" position. When the operator wishes an upshift from the current gear ratio to the next adjacent gear ratio, what one has to do is to move the shift lever 15 to the upshift "+" position. When the operator wishes a downshift from the current gear ratio to the next adjacent gear ratio, one has to move the select lever 15 to the downshift "−" position.

In response to selection of the M mode, the controller 14 conditions the overrunning clutch solenoid 10 to one of "ON" or "OFF" state to cause engagement of the overrunning clutch OR/C for each of the first to third gear ratios. The engagement of the overrunning clutch OR/C is released for the fourth gear ratio by conditioning the overrunning clutch solenoid 10 to the other state. For the first gear ratio, the manual valve distributes oil under line pressure to the low reverse brake LR/B. Thus, the low reverse brake LR/B is engaged in addition to the overrunning clutch OR/C.

Automatic shift in the D range in the D mode is briefly explained. The controller 14 controls the shift solenoids A and B to accomplish a desired gear ratio that has been given after retrieving data from the shift point map for the D range using the vehicle speed signal VSP and engine load signal TVO.

In response to the engine braking demand from the OD inhibitor switch 13, the controller 14 prohibits an upshift to the fourth gear ratio and engages the overrunning clutch OR/C through the solenoid 10 to effect engine braking during operation with the third gear ratio.

When the operator selects the II range through the selector lever 15, the controller 14 prohibits an upshift to the third gear ratio and engages the overrunning clutch OR/C through the solenoid 10 to effect engine braking during operation with the second gear ratio.

When the operator selects the I range through the selector lever 15, the controller 14 prohibits upshift to the second gear ratio and engages the overrunning clutch OR/C through the solenoid 10. At the same time, oil under line pressure is supplied to the low reverse brake LR/B from the manual valve that has been set to the "I" range position. Thus, engine braking is effected during operation with the first gear ratio.

Figure 3:
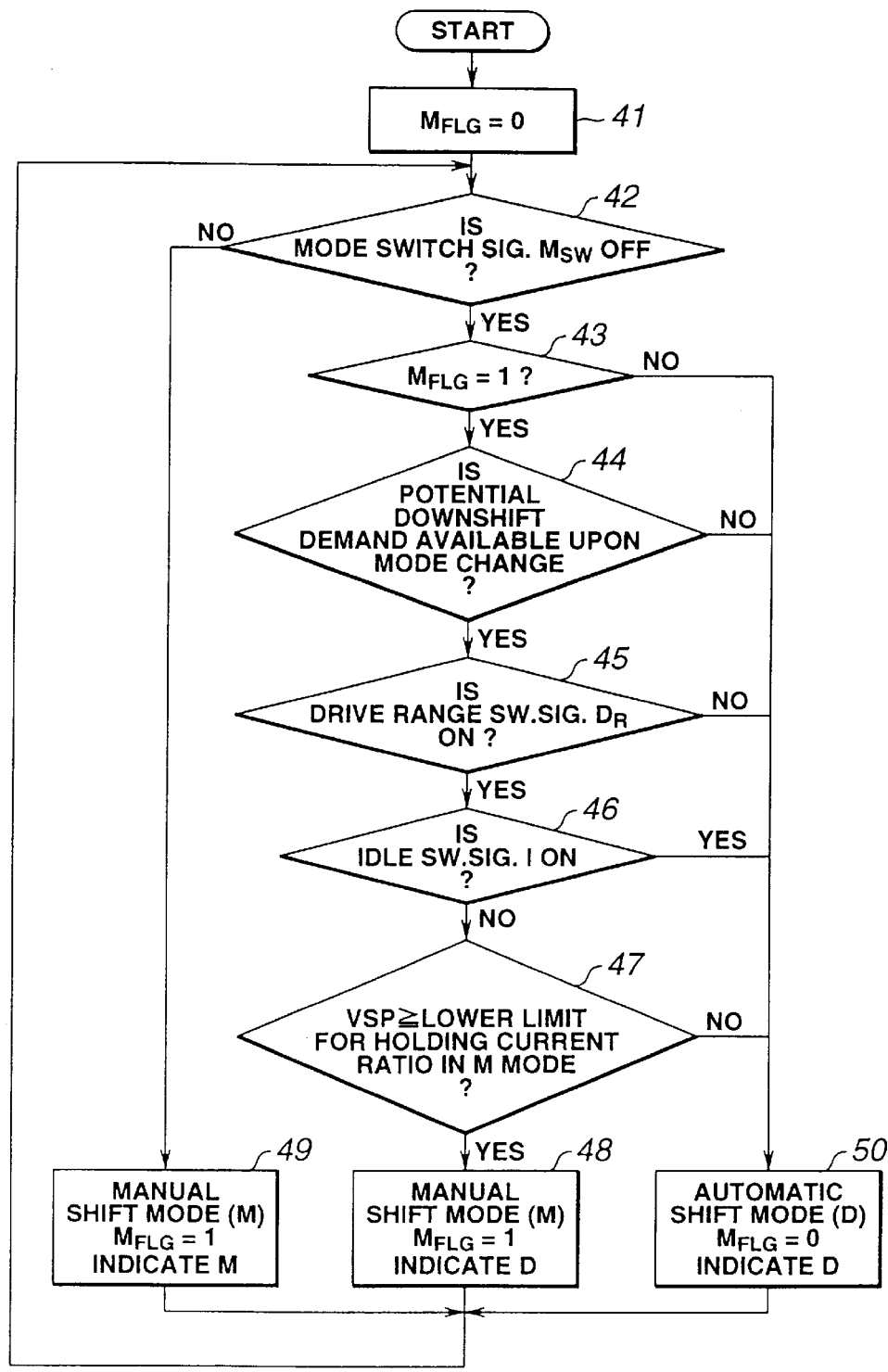
FIG. 3 is a flow chart of a control routine implementing the present invention.

The flow chart of FIG. 3 illustrates a control routine of the preferred implementation of the present invention.

In step 41, the MPU initializes a mode flag $M_{FLG}$ ($M_{FLG}$=0). This mode flag $M_{FLG}$ is at zero (0) level, indicating the result of the last run of the control routine that automatic transmission operated in the automatic shift mode. The mode flag $M_{FLG}$ is at one (1) level, indicating the result of the last run of the control routine that automatic transmission operated in the manual shift mode.

In the next step 42, the MPU determines whether the select lever 15 is placed at the D mode indicative of a demand for automatic shift mode or the M mode indicative of a demand for manual shift mode after looking into the two-level mode switch signal $M_{SW}$. The mode switch signal $M_{SW}$ assumes "OFF" level when the select lever 15 is placed at the D mode, while it assumes ON level when the select lever 15 is placed at the M mode. In step 42, there is the interrogation whether or not the mode switch signal $M_{SW}$ is at OFF level.

If, in step 42, the level of the mode switch signal $M_{SW}$ is found to be "OFF", the routine proceeds to step 43. This reflects the case where the select lever 15 is placed at the D position.

If, in step 42, the level of the mode switch signal $M_{SW}$ is found to be "ON", the routine proceeds to step 49. This reflects the case where the select lever 15 is placed at the M position. In step 49, the MPU performs data processing procedure needed to render the automatic transmission 3 operable in manual shift (M) mode. In the same step 49, the MPU sets the mode flag $M_{FLG}$ ($M_{FLG}$=1) and produces a first kind of instructions for application to the indicator 19. In response to the first kind of instructions, the indicator 19 may visually indicate that the manual shift (M) mode is installed.

In step 43, the MPU determines whether or not the automatic transmission 3 operated in the manual shift mode upon completion of the last run of the control routine. Examining the level of the mode flag $M_{FLG}$ makes this determination. The interrogation in step 43 is whether or not the mode flag $M_{FLG}$ is set ($M_{FLG}$=1). If this is the case, the routine proceeds to step 44. If this is not the case, the routine proceeds to step 50. This is the case where the automatic transmission 3 operated in the automatic shift mode upon completion of the last run of the control routine. In step 50, the MPU performs data processing procedure needed to render the automatic transmission 3 operable in automatic shift mode. In the automatic shift mode, the MPU controls the gear ratio after retrieving data using the magnitude of engine load signal TVO and the magnitude of vehicle speed signal VSP. In the same step 50, the MPU resets the mode flag $M_{FLG}$ ($M_{FLG}$=0) and produces a second kind of instructions for application to the indicator 19. In response to the second kind of instructions, the indicator 19 may visually indicate that the automatic shift mode is installed.

Figure 5A:
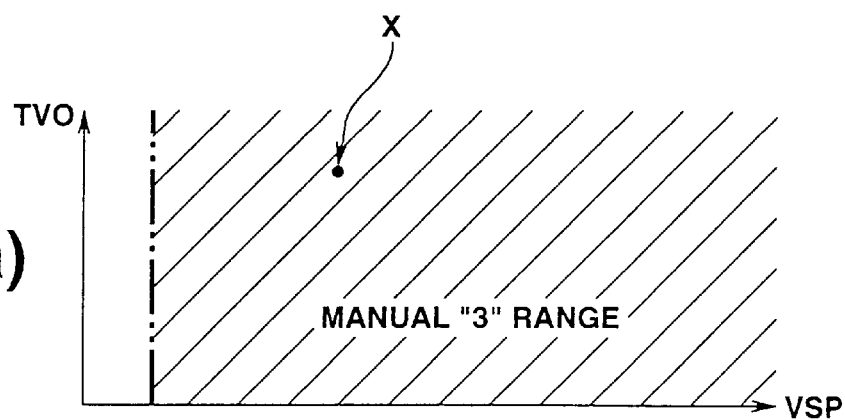
FIG. 5(a) is a simplified illustration of the second shift point map for the manual shift range in the manual shift mode.
Figure 5B:
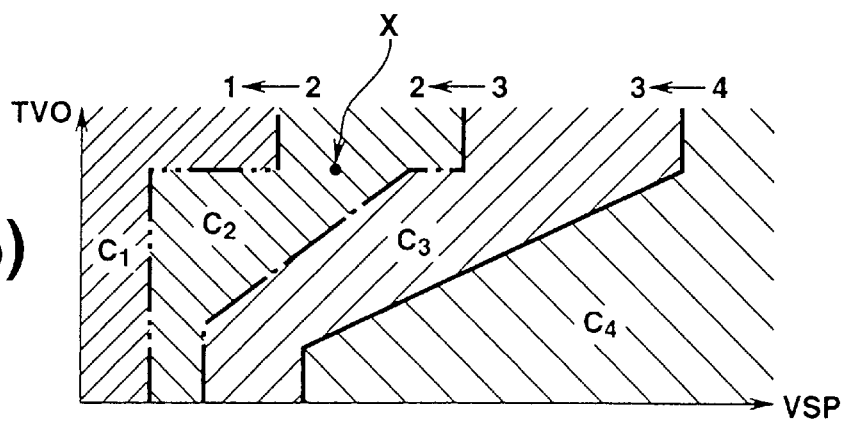
FIG. 5(b) is a simplified illustration of the first shift point map for the automatic shift (drive) range in the automatic shift mode.

In step 44, the MPU determines whether or not a downshift is required upon a change from the manual shift mode to the automatic shift mode. More particularly, the MPU determines that a downshift is required if a gear ratio that is demanded by the automatic shift mode is lower than the current gear ratio that is demanded by the manual shift mode. Such discrepancy in gear ratio occurs due to the fact that each of gear ratios demanded by the manual shift mode extends further than the corresponding gear ratio demanded by the automatic shift mode. Referring to FIGS. 5(a) and 5(b), the operating point x that falls in the third gear ratio according to the second shift point map for the M mode falls in the second gear ratio according to the first shift point map for the D mode.

If, in step 44, the MPU determines no downshift is required upon a change from the M mode to the D mode, the routine proceeds to step 50. In step 50, the MPU performs data processing procedure needed to render the automatic transmission 3 operable in automatic shift mode.

In step 45, the MPU determines whether or not the D range is selected in the D mode. ON or OFF level of switch signal Dr from the D range switch is used for this determination. The D range switch signal Dr assumes ON level when the operator selects the D range in the D mode. The D range switch signal Dr assumes OFF level when the operator selects any one of the other ranges.

If, in step 45, the MPU determines that the D range has been selected, the routine proceeds to step 46. If, in step 45, the MPU determines that any one of the other ranges is selected, the routine proceeds to step 50. In step 50, the MPU performs data processing procedure needed to render the automatic transmission 3 operable in automatic shift mode. Assume now that after having moved the select lever 15 from the M mode to the D mode, the operator moves the select lever 15 to the engine braking range (I or II range in this embodiment) other than the D range. In this case, the routine proceeds from step 45 to step 50 so that operation in the manual shift mode is not maintained and operation in the automatic shift mode is initiated. Placing the select lever 15 at the engine braking range in the D mode causes the MPU to perform data processing needed to operate the automatic transmission in accordance with the appropriate shift point map to the selected for engine braking operation. The operator may recognize the occurrence of the downshift anticipated in step 44 upon initiation of the operation in the automatic shift mode as a downshift due to selection of the range for engine braking operation. Thus, the operator may accept the occurrence of such downshift naturally as initiation of engine braking operation.

The ranges other than the D range in the D mode include Park (P) range, Neutral (N) range and engine braking ranges (II range and I range in this embodiment).

In step 46, the MPU determines whether or not the accelerator (or gas) pedal is released. The idle switch 20 is turned on to produce an ON level idle switch signal I when the operator releases the accelerator pedal and it is turned off to produce an OFF level idle switch signal I when the operator steps on the accelerator pedal. The determination in step 46 is based on ON or OFF level of the idle switch signal I.

If, in step 46, the idle switch signal I is at OFF level, the routine proceeds to step 47. In this case, the MPU determines that the operator steps on the accelerator pedal.

If, in step 46, the MPU determines that the operator releases the accelerator pedal in response to the fact that the idle switch signal I is at ON level, the routine proceeds to step 50. In step 50, the MPU performs data processing procedure needed to render the automatic transmission 3 operable in automatic shift mode. This is the case where the operator releases the accelerator pedal upon manipulation of the select lever 15 to move from the M mode to the D mode. In this case, operation in the manual shift mode is not maintained and operation in the automatic shift mode is initiated. The shift point map for the D range provides an appropriate gear ratio to vehicle speed, ensuring improved acceleration for the subsequent operator power demand through the accelerator pedal.

In step 47, the MPU determines whether or not the current vehicle speed VSP is greater than or equal to a lower limit needed for the vehicle to operate normally with the selected gear ratio in the manual shift mode.

In the manual shift mode, the selected gear ratio is basically maintained unless the operator moves the select lever 15 to the upshift (+) position or the downshift (−) position in the M range. If the selected gear ratio covers drive at high speeds, it is necessary to set a lower limit vehicle speed to prevent occurrence of engine stall and vibrations and to make a shift to an appropriate gear ratio to the vehicle speed when it drops below the lower limit value.

According to the preferred embodiment, the lower limit needed for the vehicle to operate normally with the third gear ratio is illustrated at two-dot chain line in FIG. 5(a).

If, in step 47, the vehicle speed VSP is higher than or equal to the lower limit, the routine proceeds to step 48. If, in step 47, the vehicle speed VSP is lower than the lower limit, the routine proceeds to step 50. In step 50, the MPU performs data processing procedure needed to render the automatic transmission 3 operable in automatic shift mode.

In step 48, the MPU performs data processing procedure needed to render the automatic transmission 3 operable in manual shift mode. In the same step 48, the MPU sets the mode flag $M_{FLG}$ ($M_{FLG}=1$) and produces the second kind of instructions for application to the indicator 19. In response to the second kind of instructions, the indicator 19 may visually indicate that the automatic shift mode is installed.

According to the control routine as illustrated by the flow chart in FIG. 3, as long as the operator leaves the select lever 15 at the D mode, the MPU performs data procedure needed to render the automatic transmission 3 operable in the automatic shift mode. In the automatic shift mode, a gear ratio is determined against engine load signal TVO and vehicle speed signal VSP.

According to the control routine, as long as the operator leaves the select lever 15 at the M mode, the MPU performs data procedure needed to render the automatic transmission 3 operable in the manual shift mode. In the M mode, the operator can select any one of forward gear ratios.

In spite of manipulation of the select lever 15 from the M mode to the D mode, the manual shift mode continues to avoid occurrence of a downshift, which might fall outside of where the operator expects, if such downshift is anticipated due to the mode change. In this case, the indicator 19 is instructed to visually indicate the automatic shift mode against the fact that the manual shift mode holds. The reason for this discrepancy is as follows:

A mode change through the select lever 15 from the M mode to the D mode may produce a potential demand for a downshift, which might fall outside of where the operator normally anticipates. To avoid occurrence of such downshift, the mode change in the automatic transmission is delayed and the manual shift mode continues. This manual shift mode is replaced with the automatic shift mode upon subsequent disappearance of the potential demand for such downshift or upon operator readiness for accepting shocks inherent with occurrence of such downshift. Thus, the operator accepts naturally the visual indication, by the indicator 19, that the automatic shift mode is installed reflecting the position selected by the select lever 15, although the manual shift mode continues in the automatic transmission 3.

Subsequently, when a reduction in engine load signal TVO or an increase in vehicle speed signal VSP produces no potential demand for a downshift upon mode change, the automatic shift mode replaces the manual shift mode.

The operator accepts naturally occurrence of a downshift upon the mode change to the automatic shift mode when he/she selects through the select lever 15 the II range or I range for engine braking operation. The operator accepts naturally the downshift when the vehicle speed drops below the lower limit needed for the vehicle to operate smoothly with the gear ratio set in the manual shift mode. Thus, under these conditions, the automatic shift mode replaces the manual shift mode even if there is a potential demand for a downshift upon mode change to the automatic shift mode.

The mode switch 16 may take another form. According to this form, the mode switch 16 produces an automatic shift mode switch signal $M_D$ and a manual shift mode switch $M_m$.

The automatic shift mode switch signal $M_D$ takes an ON level when the select lever 15 is placed at the D mode. It takes an OFF level when the select lever 15 is not placed at the D mode. The manual shift mode switch signal $M_m$ takes an ON level when the select lever 15 is placed at the M mode. It takes an OFF level when the select lever 15 is not placed at the M mode.

Figure 4:
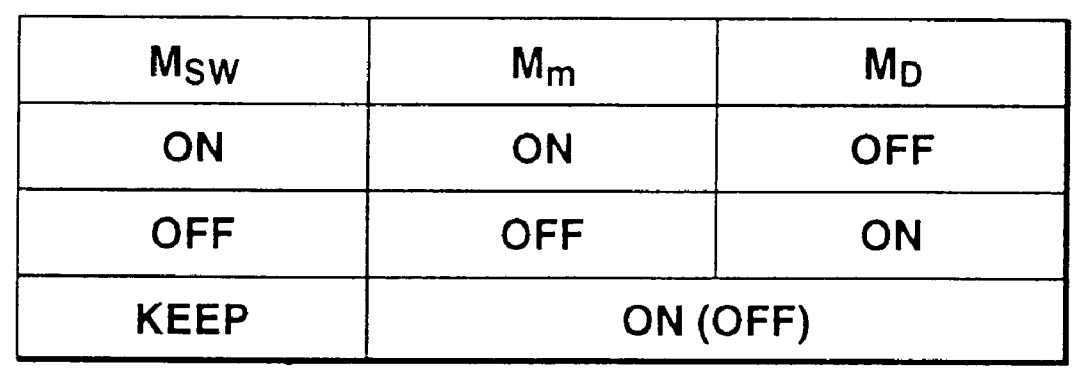

The table in FIG. 4 illustrates relationship between the mode switch signal $M_{SW}$, the automatic shift mode switch signal $M_D$ and the manual shift mode switch signal $M_m$. When the select lever 15 is placed at the D mode, the mode switch signal $M_{SW}$ is at OFF level, while the automatic shift mode switch signal $M_D$ is at ON level and the manual shift mode switch signal $M_m$ is at OFF level. When the select lever 15 is placed at the M mode, the mode switch signal $M_{SW}$ is at ON level, while the automatic shift mode switch signal $M_D$ is at OFF level and the manual shift mode switch signal $M_m$ is at ON level. During a transient period when the select lever 15 moves between the D mode and the M mode, the mode switch signal $M_{SW}$ keeps its previous level, while both the automatic and manual shift mode switch signals $M_D$ and $M_m$ take the same level The same level may be ON or OFF level.

In the previous description, the invention is embodied in a change between automatic shift mode and manual shift mode, which is one example of a special shift mode. The present invention may be embodied in a change between automatic shift mode and other special shift mode. Other examples of the special shift mode are an economy mode, a snow mode and a power mode. In the economy mode, with the same vehicle speed signal VSP, a higher gear ratio than a gear ratio selected in the automatic shift mode is selected. In the snow mode, a shift to the lowest gear ratio is prohibited. In the power mode, with the same vehicle speed signal VSP, a lower gear ratio than a gear ratio selected in the automatic shift mode is selected.

From the previous embodiment, it is now understood that the operator can manually effect a change from the special shift mode to the automatic shift mode without any occurrence of a downshift, which may fall outside of what the operator expects. This is because the special shift mode continues when a potential downshift demand is available upon the mode change.

The content of disclosure of Japanese Patent Application No. 10-102569 (filed Apr. 14, 1998) is hereby incorporated by reference in its entirety.

The above-described implementation of the present invention is an example implementation. Moreover, various modifications to the present invention may occur to those skilled in the art and will fall within the scope of the present invention as set forth below.

What is claimed is:

1. A shift mode selector for an automatic transmission of a vehicle drive train including an engine, comprising:
    a memory including a first shift point map for an automatic shift range in an automatic shift mode and a second shift point map for a manual shift range in a special shift mode;
    an input device producing an operator mode change demand from the special shift mode to the automatic shift mode;
    a microprocessor determining whether or not a potential downshift demand is available upon effecting a change from the second shift point map to the first shift point map due to a mode change demanded by said operator mode change demand,
    said microprocessor delaying the change in shift point map and producing a gear ratio control signal in accordance with said second shift point map upon determination that said potential downshift demand is available unless a predetermined condition is met; and
    a gear ratio control actuator establishing various gear ratios in the automatic transmission in response to said gear ratio control signal.

2. The shift mode selector as claimed in claim 1, further comprising an indicator that indicates the automatic shift mode corresponding to the automatic shift mode demanded by said operator mode change demand.

3. A shift mode selector for an automatic transmission of a vehicle drive train including an engine, comprising:
    a memory including a first shift point map for an automatic shift range in an automatic shift mode and a second shift point map for a manual shift range in a special shift mode;
    an input device producing an operator mode change demand from the special shift mode to the automatic shift mode;
    a microprocessor determining whether or not a potential downshift demand is available upon effecting a change from the second shift point map to the first shift point map due to a mode change demanded by said operator mode change demand,
    said microprocessor delaying the change in shift point map and producing a gear ratio control signal in accordance with said second shift point map upon determination that said potential downshift demand is available unless a predetermined condition is met; and
    a gear ratio control actuator establishing various gear ratios in the automatic transmission in response to said gear ratio control signal,
    wherein said predetermined condition is met upon operator selection of a third shift point map for engine braking operation in the automatic shift mode.

4. A shift mode selector for an automatic transmission of a vehicle drive train including an engine, comprising:
    a memory including a first shift point map for an automatic shift range in an automatic shift mode and a second shift point map for a manual shift range in a special shift mode;
    an input device producing an operator mode change demand from the special shift mode to the automatic shift mode;
    a microprocessor determining whether or not a potential downshift demand is available upon effecting a change from the second shift point map to the first shift point map due to a mode change demanded by said operator mode change demand, said microprocessor delaying the change in shift point map and producing a gear ratio control signal in accordance with said second shift point map upon determination that said potential downshift demand is available unless a predetermined condition is met; and a gear ratio control actuator establishing various gear ratios in the automatic transmission in response to said gear ratio control signal, wherein said predetermined condition is met upon production of an operator coasting demand through an idle switch.

5. A shift mode selector for an automatic transmission of a vehicle drive train including an engine, comprising:

a memory including a first shift point map for an automatic shift range in an automatic shift mode and a second shift point map for a manual shift range in a special shift mode;

an input device producing an operator mode change demand from the special shift mode to the automatic shift mode;

a microprocessor determining whether or not a potential downshift demand is available upon effecting a change from the second shift point map to the first shift point map due to a mode change demanded by said operator mode change demand, said microprocessor delaying the change in shift point map and producing a gear ratio control signal in accordance with said second shift point map upon determination that said potential downshift demand is available unless a predetermined condition is met; and a gear ratio control actuator establishing various gear ratios in the automatic transmission in response to said gear ratio control signal, wherein said predetermined condition is met when the measure of a vehicle operating parameter drops below a lower limit of the vehicle operating parameter needed for the vehicle to drive smoothly with the gear ratio established in the special shift mode.

6. The shift mode selector as claimed in claim 1, wherein said special shift mode is a manual shift mode enabling the operator to determine the gear ratio in the automatic transmission.

7. A control system for a vehicle drive train including an engine and an automatic transmission that includes a gear ratio actuator operative in response to a gear ratio control signal to establish various gear ratios, comprising:

a vehicle speed sensor sensing a first operating parameter indicative of vehicle speed and producing a vehicle speed signal;

an engine load sensor sensing a second operating parameter indicative of the magnitude of engine load and producing an engine load signal;

a coasting sensor sensing an operator coasting demand and producing a coasting demand signal;

an input device producing an operator mode change demand; and a controller receiving the vehicle speed signal, the engine load signal, the coasting signal and the operator mode change signal, said controller storing a plurality of shift point maps, effecting a change from one of the plurality of shift point maps to another of the shift point maps that is for an automatic shift range in an automatic shift mode in response to at least one of said signals, determining whether or not a potential downshift demand is available upon effecting the change, and prohibiting the change to produce the gear ratio control signal based on data from the one shift point map.

8. A shift mode selector for an automatic transmission of a vehicle drive train including an engine, comprising:

means for storing a first shift point map for an automatic shift range in an automatic shift mode and a second shift point map for a manual shift range in a special shift mode;

means for producing an operator mode change demand from the special shift mode to the automatic shift mode;

a microprocessor determining whether or not a potential downshift demand is available upon effecting a change from the second shift point map to the first shift point map due to a mode change demanded by said operator mode change demand, said microprocessor delaying the change in shift point map and producing a gear ratio control signal in accordance with said second shift point map upon determination that said potential downshift demand is available unless a predetermined condition is met; and a gear ratio control actuator establishing various gear ratios in the automatic transmission in response to said gear ratio control signal.

* * * * *